United States Patent [19]
Ludwig

[11] 3,808,684
[45] May 7, 1974

[54] ATTACHMENT FOR A CHAIN SAW
[76] Inventor: Robert L. Ludwig, P.O. Box 26, Mt. Cory, Ohio 45868
[22] Filed: Feb. 25, 1972
[21] Appl. No.: 229,309

[52] U.S. Cl.................. 30/382, 30/371, 83/788, 56/291
[51] Int. Cl............................................ B27b 17/02
[58] Field of Search........ 83/788, 814; 30/382, 371; 56/291, 290

[56] References Cited
UNITED STATES PATENTS
| | | | |
|---|---|---|---|
| 2,832,136 | 4/1958 | Trecker | 30/371 |
| 1,532,279 | 4/1925 | Ullom | 56/291 |
| 3,059,673 | 10/1962 | Woleslagle | 30/382 |
| 369,095 | 8/1887 | Brown | 56/291 |

Primary Examiner—Donald R. Schran
Attorney, Agent, or Firm—Owen & Owen

[57] ABSTRACT

An attachment for a chain saw including a shield which overlaps opposite sides and an end of the chain saw bar. V-shaped notches in the shield are in serial relationship along a cutting edge of the chain saw. A V-base of each notch extends to a point below protruding cutting teeth on the saw chain. V-tops of the notches join, substantially above the cutting teeth, to form a row of stationary guide teeth for introducing small objects into the notches against the cutting teeth. A mechanism is provided for ready attachment and removal of the shield.

2 Claims, 6 Drawing Figures

PATENTED MAY 7 1974  3,808,684
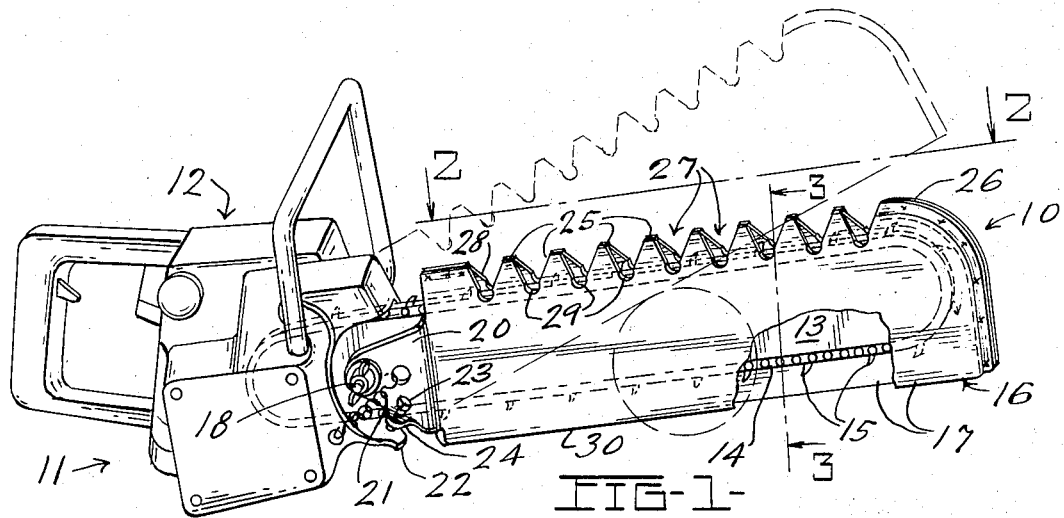
FIG-1-
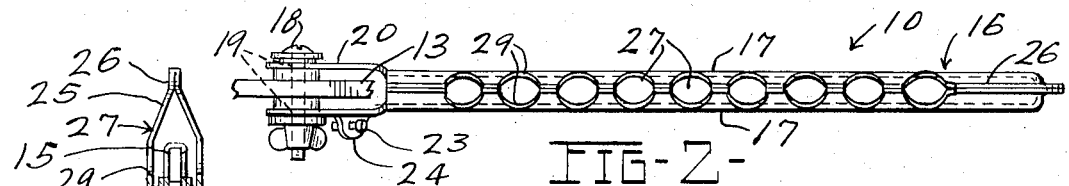
FIG-2-
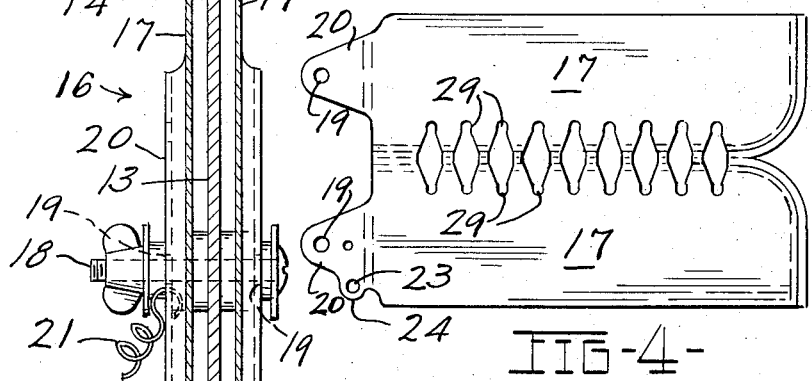
FIG-3-
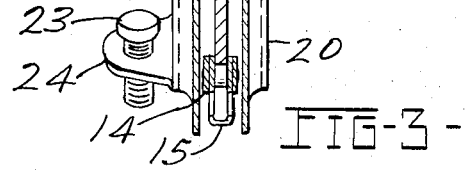
FIG-4-
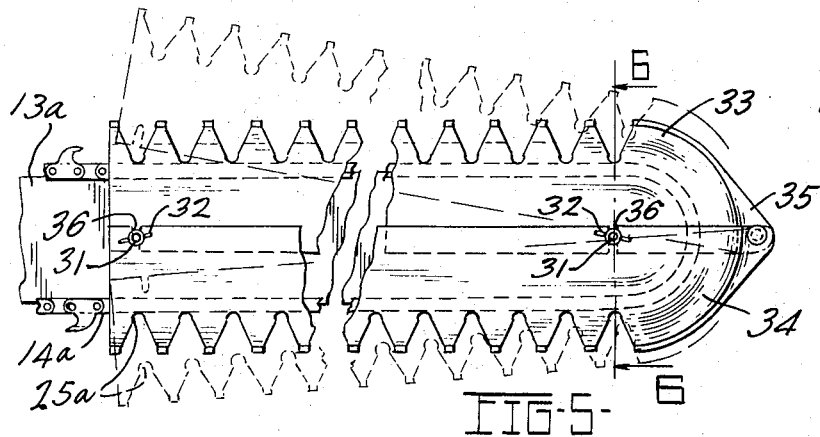
FIG-5-
FIG-6-

ATTACHMENT FOR A CHAIN SAW

BACKGROUND OF THE INVENTION

Conventional chain saws are generally designed for cutting large pieces of timber, such as tree trunks and the like. Such chain saws are not designed for clearing brush or small branches because these small objects are not usually retainable against the fast moving saw chain for cutting by the saw teeth. U.S. Pat. Nos. 2,698,034 and 2,797,358 disclose brush cutting attachments for chain saws which are intended to trap the brush and hold it against the saw blade. The present invention contemplates an attachment for a chain saw to adapt the saw for brush cutting, clearing and even for clipping small branches as in a hedge. The attachment also incorporates a guard mechanism for rendering the saw safe to use in conjunction with branch or log cutting operations.

SUMMARY OF THE INVENTION

The invention comprises an attachment for a chain saw. The attachment incorporates a generally elongate shield overlapping opposite sides and the end of a conventional chain saw bar or chain guide. The shield is removably mounted on the chain saw either by bolts and eye nuts or by a pivot pin inserted through the rear of the chain saw bar. In one embodiment of the invention the pivot pin is utilized in conjunction with a bias spring to permit the shield to pivot, about one end, away from the chain saw bar as the bar is passed through a piece of timber. The bias spring urges the shield against a stop abutment to hold it in place over the chain saw board when timber is being cut along the one edge of the chain saw. Along an opposite cutting edge of the saw chain is a row of stationary guide teeth serially spaced in the shield. The protruding guide teeth define notches therebetween whose bases extend below the path of the cutting teeth of the saw chain. As small branches or other small objects are introduced along the row of guide teeth, they are directed down the notches and held against the cutting teeth.

In a second embodiment of the invention, the stationary guide teeth are on each of the opposite cutting edges of the shield over the chain saw bar. In this embodiment the shield is useable for right-hand and left-hand brush cutting.

BRIEF DESCRIPTION OF THE DRAWINGS

FIG. 1 is a perspective view of a chain saw having the shield of the present invention in place thereon;

FIG. 2 is an overhead view of the shield of the present invention taken along line 2—2 of FIG. 1;

FIG. 3 is a cross-sectional view of the shield of the present invention taken along line 3—3 of FIG. 1;

FIG. 4 is a view of the shield of the present invention before it is folded into shape for placement over a chain saw blade;

FIG. 5 is a view of a second embodiment of the shield of the present invention with parts broken away; and FIG. 6 is a cross-sectional view of the shield taken along line 6—6 of FIG. 5.

DESCRIPTION OF THE PREFERRED EMBODIMENTS

Referring to FIGS. 1–4, a first embodiment of the attachment 10 of the present invention is shown in place on a chain saw 11. The chain saw has a housing 12, an elongate chain guide 13 connected to the housing 12, a saw chain 14 driven around the periphery of the chain guide 13 by a motor (not shown), and cutting teeth 15 carried by the saw chain 14.

The attachment 10 comprises a shield 16 having plates 17 which extend from a mid-line $m$ over opposite sides of the chain guide 13 when in place on the chain saw 11 as shown in FIG. 1. The shield 16 is pivotally attached to the chain guide 13 by a pin 18 extending through one end of the guide and through holes 19 in support flanges 20 connected to one end of the shield 16. A bias spring 21, connected to the shield 16 and to the housing 12, pivotally urges the shield 16 against a stop 22 on the housing 12 to maintain the attachment 10 over the chain guide 13. A set screw 23 connected to a lip 24 on the shield 16 strikes the stop 22 to support the shield 16 in a guarding position over the chain guide 13.

Stationary guide teeth 25 lie within an upper edge 26 of the shield 16. The guide teeth 25 define notches 27 within the upper edge 26. The notches comprise a V-base 28 each of which extends below the cutting path of the saw teeth 15. At the bottom of each V-base 28, is a relieved, semi-circular catch area 29. As the upper edge 26 of the shield 16, carrying the guide teeth 25 is moved against, for example, brush or small branches, the branches are directed downwardly within the notches 27 until they are caught within the catch areas 29 and are retained against the cutting teeth 15.

A lower edge 30 of the shield 16 extends parallel to and in overlapping relationship with a second cutting surface of the chain saw 14. As explained above, the shield 16 is pivotally mounted on the chain guide 13 for pivoting away from the normal guarding position along the lower edge 30. When it is desired to cut large pieces of timber, the lower edge 30 is placed against the piece to be cut. Pressure on the lower edge 30 causes the shield 16 to pivot upwardly, as shown in FIG. 1, exposing the lower cutting edge of the saw chain 14 to the timber. As the timber is cut, the chain guide 13 passes through the piece, further urging the shield 16 upwardly. Once the timber is severed, the shield 16 is pivotally urged toward its normal guarding position by the bias spring until the set screw strikes the stop 22 as explained.

Referring to FIGS. 5 and 6, a second embodiment of the attachment 10 is shown. In this embodiment, guide teeth 25a extend along opposite cutting edges of the chain guide 13a. The shield 16a of this embodiment is mounted on the chain guide 13a by bolts 31 extending through the chain guide 13a and wing nuts 32 threadably attached to the bolts 31. The shield 16a has opposing welded plates 17a which overlap and enclose the chain guide 13a as shown in FIG. 6.

The shield 16a is divided in upper and lower halves 33 and 34 respectively. A hinge 35 at the end of the shield 16a provides means for "scissoring" the upper half 33 away from the lower half 34 as illustrated in FIG. 5. The shield 16a is installed over the chain guide 13a by separating the upper and lower halves 33 and 34 and closing them in position over the chain guide 13a. Slots 36 in the upper and lower halves 33 and 34 engage the bolts 31 when the shield 16a is thus scissored into place with an edge of the lower half 34 overlapping an edge of the upper half 33. Tightening of the wing nuts 32 against the overlapping edges of the upper and lower halves 33 and 34 grippingly engages the shield 16a in place over the chain guide 13a. Thus installed, the chain saw can be used for right-hand and left-hand brush cutting and clearing.

Various other embodiments and variations may be apparent to those skilled in the art and may be made without departing from the spirit and scope of the following claims. I claim:

1. For use with a chain saw having a housing, a flat elongate chain guide extending from the housing, a saw chain driven by a motor around the periphery of the chain guide and cutting teeth carried by the chain, an attachment in the form of an elongate shield, said elongate shield comprising a plate folded to extend over the chain guide and saw chain forming a folded first edge, a row of guide teeth positioned on said first edge and having truncated tips along said first edge for maintaining the structural integrity of said first edge, an end, and a second edge, said end being sealed together and said second edge being open to form a guard channel, means for pivotally attaching said shield to one end of the elongate chain guide for movement of said shield away from the chain guide from a first closed guarding position to a second open cutting position, and bias means for urging said shield toward its said first closed guarding position, said folded first edge of said shield extending beyond the path of the cutting teeth and said guide teeth defining notches in said shield extending below the path of the cutting edge of said cutting teeth when said shield is in said closed position.

2. An attachment for a chain saw according to claim 1 wherein said guide teeth are generally triangular in shape to define a tapered notch between adjacent teeth, with the inner apex of said notch terminating in a generally semi-circular relieved portion for catching and trapping the pieces to be cut.

* * * * *